Aug. 23, 1960 R. SHAW, JR., ET AL 2,949,786
TIME-DELAY CONTROL CIRCUIT FOR DIRECTIONAL GYRO ERECTION SYSTEM
Filed May 3, 1957
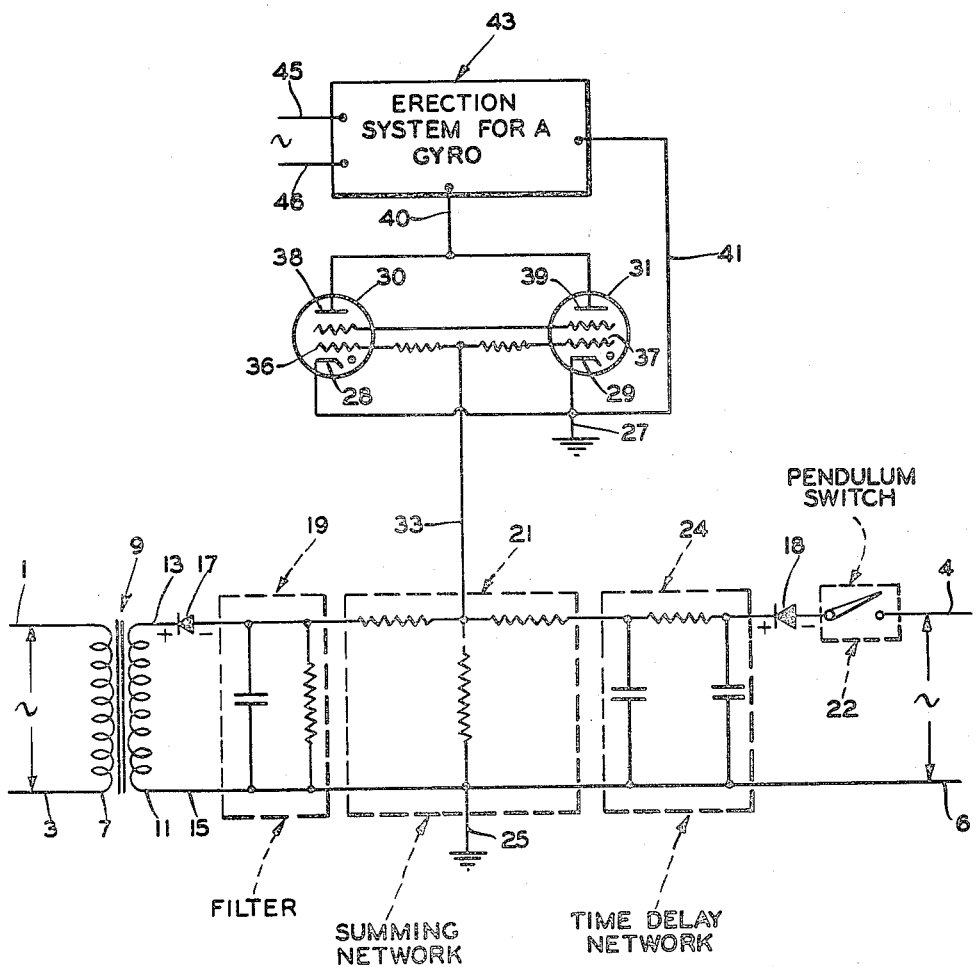
INVENTORS
ROBERT H. DEAHL
RICHARD SHAW, JR.
BY *Hubert T. Davis*
ATTORNEY United States Patent Office 2,949,786
Patented Aug. 23, 1960

2,949,786

TIME-DELAY CONTROL CIRCUIT FOR DIRECTIONAL GYRO ERECTION SYSTEM

Richard Shaw, Jr., Mahwah, and Robert H. Deahl, Ridgewood, N.J., assignors to The Bendix Corporation, a corporation of Delaware Filed May 3, 1957, Ser. No. 656,820

2 Claims. (Cl. 74—5.41)

The invention relates to improvements in a control circuit for a directional gyro of a type to prevent precession in azimuth, resulting from a combination of the tilting and acceleration effects on a directional gyro, as explained in the copending U.S. application Serial No. 430,269, filed May 17, 1954, by Charles E. Hurlburt and Sheldon M. Waldow, now U.S. Patent No. 2,854,851, granted October 7, 1958, and assigned to Bendix Aviation Corporation.

In the last-mentioned copending application, it was pointed out that one cause of gyro drift may be eliminated, if a suitable time-delay is introduced between the sensing device such as a pendulum switch and the actuating device or erection system which may include a torque motor.

An object of the present invention is to provide an improved time-delay circuit so arranged as to eliminate the possibility of a starting-up condition tending to cause premature failures in the thyratron tubes of the control circuit.

In the time-delay circuit of the U.S. Patent No. 2,854,851 the essential components are a half-wave rectifier with its associated filter circuit, a pendulum-operated switch, a resistance-capacitor time-delay circuit, and two thyratrons in parallel which control current to the torquer. When the pendulum switch is open negative voltage from the rectifier is applied to the grids of the thyratrons, maintaining them in a non-conducting state. When the pendulum switch is closed the timing capacitor is discharged through the resistor, raising the grid to cathode potential after a time-delay, thus allowing the thyratrons to fire. When the switch is reopened, the capacitor is recharged through the resistors in series, and the grids become sufficiently negative to cut off the plate current. (Strictly speaking, the current will not be cut off until the alternating plate voltage passes through zero.)

Trouble may occur in such an arrangement when power is first applied to this circuit. Voltage is applied to the plates immediately, but even when the pendulum switch is open, the voltage requires several seconds to build up on the grid, because of the time-delay circuit. Consequently, the cathode is exposed to the electric field established by the plate before the tube has warmed up sufficiently to establish space charge. This strong field can damage the cathode surface, and might be responsible for tube failures.

An object of the present invention is to provide an improved time-delay circuit in which instead of switching a negative grid voltage on and off, as in the time-delay circuit of the U.S. Patent No. 2,854,851, the negative voltage applied to the improved time-delay circuit is continuously connected and, when desirable, cancelled by switching a positive voltage into opposing relation therewith.

Another object of the invention is to so arrange the time-delay circuit in the improved control circuit as to affect only the opposing positive voltage, thus assuring that the grids of the respective thyratron tubes will always be negative while the tubes are warming up.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

The drawing is a diagrammatic showing of the improved electrical control circuit.

Referring to the drawing, the control circuit includes input lines 1 and 3; and 4 and 6 leading from a suitable source of alternating current. Across the input lines 1 and 3 is a primary winding 7 of a transformer 9 having a secondary winding 11 inductively coupled thereto and lines 13 and 15 leading therefrom. The transformer 9 serves to drop the A.C. input voltage applied across the lines 1 and 3 so that the A.C. voltage applied across the transformer output lines 13 and 15 is somewhat less than that applied across the input lines 1 and 3 and 4 and 6.

The control circuit includes two rectifiers 17 and 18. The rectifier 17 supplies negative voltage from transformer 9 through a filter circuit 19 to a summing network or resistor 21 and the other rectifier 18 upon switch 22 being closed delivering positive voltage from the supply lines 4 and 6 directly through a resistor-capacitor time-delay network 24 to the same summing network 21. An output terminal of the summing network 21 is connected through grounded connections 25 and 27 to cathodes 28 and 29 of thyratrons 30 and 31 respectively, while an opposite output terminal of the summing network 21 is connected through conductor 33 to the control grids 36 and 37 of the thyratrons 30 and 31.

The thyratrons 30 and 31 have plates 38 and 39 respectively connected by conductor 40 to provide one control input line, while conductor 41 leading from the cathodes 28 and 29 provide the other control input line to an erection system for a gyro indicated generally by the numeral 43. Lines 45 and 46 from the supply of alternating current aforementioned provide input lines to the system 43.

The erection system 43 for the gyro may be of a type described in the U.S. Patent No. 2,854,851 including a suitable torque motor the direction of the torque of which, as explained therein, may be controlled by the signal voltage applied across lines 40 and 41. Furthermore, the switch 22 may be of the pendulum type, such as described in the last-mentioned application.

*Operation*

When power is first applied to the circuit, a negative voltage is immediately applied to the grids 36 and 37 through rectifier 17, protecting the cathodes 28 and 29 from the field of the plates 38 and 39, regardless of the position of the pendulum switch 22. If the switch 22 is open, the grids 36 and 37 will remain negative. If the switch 22 is closed when power is applied, a positive voltage from rectifier 18 will be transmitted through the time-delay circuit 24 to the summing network 21, where it will over-ride the negative voltage and cause one or the other of the tubes 30 and 31 to fire. The time-delay is sufficient, however, to allow the tubes 30 and 31 to warm up adequately before firing occurs.

When the pendulum switch 22 is open, negative voltage from rectifier 17 applied to the grids 36 and 37 keeps the tubes 30 and 31 cut off; and when the switch 22 is closed positive voltage from rectifier 18 slowly builds up a charge on the capacitors of the time-delay network 24 until it over-rides the negative voltage applied to the grids 36 and 37 and fires one or the other of the tubes 30 and 31.

The arrangement is such that due to inherent inequalities, one of the tubes may begin conduction before the other tube whereupon the drop in the anode potential of the conducting tube after breakdown may prevent the other tube from conducting. One tube or the other, however, is available for conduction and should there be a failure in one tube rendering the same ineffective, the other tube remains effective to conduct. The two tube arrangement thus increases the reliability of operation of the system.

It will be seen then that in the control circuit herein provided instead of switching a negative grid voltage on and off, suitable means is provided for retaining the negative grid voltage continuously connected and cancelling it when so desired by switching in an opposing positive voltage to effect the control of the erection system 43. The time-delay circuit 24 has been so arranged as to affect only the positive opposing voltage, thus assuring that the grids 36 and 37 will be negative while the tubes 30 and 31 are warming up.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. For use with an erection system of a directional gyro, a control device of a type including an electronic valve means having a cathode, a plate and a control grid, and an output circuit for controlling the erection system including the cathode and plate of the electronic valve means; said control device including the improvement comprising first means for applying a voltage across the cathode and control grid of a polarity to negatively bias the control grid, second means for applying an opposing voltage across the cathode and control grid of a polarity to counteract the negative bias applied to the control grid so as to permit the electronic valve means to effect an electronic flow in the output control circuit, said second means including a pendulum switch means sensitive to predetermined gravitational conditions of operation of the gyro to render said second means effective and ineffective, and timing means to effect a delay in the application of said opposing voltage upon said second means being rendered effective by said pendulum switch means.

2. In an erection system of a directional gyro, the combination comprising an electronic valve means including a cathode, a plate and a control grid, an output circuit including said cathode and plate for controlling the erection system, a summing resistance means, means connecting said control grid and cathode across the summing resistance means, first rectifier means for applying a voltage across the summing resistance means of a polarity to negatively bias the control grid of said electronic valve means, second rectifier means for applying an opposing voltage across the summing resistance means, said second rectifier means including a pendulum switch means sensitive to predetermined gravitational conditions of operation of the gyro to render said second rectifier means effective and ineffective, and a time delay circuit operatively connected between the second rectifier means and the summing resistance means and effective to delay the application of said opposing voltage to said summing resistance means upon said second rectifier means being rendered effective by said pendulum switch means.

References Cited in the file of this patent

UNITED STATES PATENTS

| 1,946,615 | Demarest | Feb. 13, 1934 |
| 2,263,773 | Gulliksen | Nov. 25, 1941 |
| 2,294,759 | Morack | Sept. 1, 1942 |
| 2,645,942 | Hurlburt et al. | July 21, 1953 |

FOREIGN PATENTS

| 652,657 | Great Britain | Apr. 25, 1951 |